United States Patent
Sugiyama et al.

(10) Patent No.: US 10,322,573 B2
(45) Date of Patent: Jun. 18, 2019

(54) CONSTITUENT PARTICLES USED FOR PRODUCTION OF THREE-DIMENSIONAL OBJECT, POWDER INCLUDING CONSTITUENT PARTICLES, AND METHOD FOR PRODUCING THREE-DIMENSIONAL OBJECT FROM CONSTITUENT PARTICLES

(71) Applicant: CANON KABUSHIKI KAISHA, Tokyo (JP)

(72) Inventors: Akira Sugiyama, Yokohama (JP); Yukio Hanyu, Isehara (JP); Naotake Sato, Sagamihara (JP); Masahiko Takahashi, Kawasaki (JP); Tomohiro Saito, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 260 days.

(21) Appl. No.: 15/467,909

(22) Filed: Mar. 23, 2017

(65) Prior Publication Data
US 2017/0197365 A1   Jul. 13, 2017

Related U.S. Application Data

(63) Continuation of application No. PCT/JP2015/076472, filed on Sep. 17, 2015.

(30) Foreign Application Priority Data

Sep. 24, 2014 (JP) .................................. 2014-194014
Sep. 10, 2015 (JP) .................................. 2015-178950

(51) Int. Cl.
*G03G 9/08* (2006.01)
*B33Y 10/00* (2015.01)
(Continued)

(52) U.S. Cl.
CPC ............ *B33Y 10/00* (2014.12); *B29C 64/153* (2017.08); *B29C 64/223* (2017.08); *B33Y 30/00* (2014.12); *B33Y 70/00* (2014.12); *G03G 9/0819* (2013.01); *G03G 9/0821* (2013.01); *G03G 9/0935* (2013.01); *G03G 9/09307* (2013.01); *G03G 9/09321* (2013.01); *G03G 9/09328* (2013.01); *G03G 9/09371* (2013.01); *G03G 9/09378* (2013.01); *G03G 9/09385* (2013.01); *G03G 9/09392* (2013.01); *G03G 15/224* (2013.01);
(Continued)

(58) Field of Classification Search
CPC ............... G03G 9/0821; G03G 9/0935; G03G 9/09307; B33Y 10/00; B29C 64/153
USPC ...................................... 430/110.2
See application file for complete search history.

(56) References Cited

FOREIGN PATENT DOCUMENTS

JP          200353849 A      2/2003
JP          2004330743 A    11/2004
(Continued)

*Primary Examiner* — Mark A Chapman
(74) *Attorney, Agent, or Firm* — Canon U.S.A. Inc., IP Division

(57) ABSTRACT

Provided are constituent particles containing a water-soluble material with high flowability in the form of powder, the constituent particles being capable of forming a support member that can be removed with a water-containing solvent in a process for producing a three-dimensional object. The constituent particles used for the production of a three-dimensional object each include a core and a shell that covers at least part of a surface of the core, the core containing a water-soluble material most abundantly, and a material contained in the shell most abundantly having a lower water solubility than the water-soluble material contained in the core.

20 Claims, 6 Drawing Sheets

(51) Int. Cl.
    *G03G 9/093*    (2006.01)
    *G03G 15/22*    (2006.01)
    *B33Y 30/00*    (2015.01)
    *B33Y 70/00*    (2015.01)
    *B29C 64/153*   (2017.01)
    *B29C 64/223*   (2017.01)
    *B29K 33/00*    (2006.01)
    *B29K 83/00*    (2006.01)

(52) U.S. Cl.
    CPC ...... *B29K 2033/00* (2013.01); *B29K 2083/00* (2013.01)

(56) References Cited

FOREIGN PATENT DOCUMENTS

| | | | |
|---|---|---|---|
| JP | 2005533877 A | 11/2005 | |
| JP | 2007301945 A | 11/2007 | |

20.0 μm

CONSTITUENT PARTICLES USED FOR PRODUCTION OF THREE-DIMENSIONAL OBJECT, POWDER INCLUDING CONSTITUENT PARTICLES, AND METHOD FOR PRODUCING THREE-DIMENSIONAL OBJECT FROM CONSTITUENT PARTICLES

CROSS-REFERENCE TO RELATED APPLICATIONS

This application is a Continuation of International Patent Application No. PCT/JP2015/076472, filed Sep. 17, 2015, which claims the benefit of Japanese Patent Application No. 2014-194014, filed Sep. 24, 2014 and No. 2015-178950 filed Sep. 10, 2015, all of which are hereby incorporated by reference herein in their entirety.

TECHNICAL FIELD

The present invention relates to constituent particles used for the production of a three-dimensional object by an additive manufacturing process.

BACKGROUND ART

An additive manufacturing process for manufacturing a three-dimensional object (target object) by depositing a constituent material in a layer-by-layer manner on the basis of the cross-sectional data of the target object has recently been receiving attention.

PTL 1 discloses a method in which particles serving as a constituent material (constituent particles) are arranged according to the cross-sectional data of a target object by an electrophotographic process and then thermally fused together in a layer-by-layer manner.

PTL 2 discloses a method in which a layer composed of constituent particles is formed on a base and then the constituent particles are fused together in a layer-by-layer manner by spraying a liquid binder to partially dissolve the constituent particles or by irradiating the constituent particles with a laser beam according to cross-sectional data of a target object.

When a complicated form including, for example, an overhang structure or a structure including a moving part is manufactured by the additive manufacturing process, it is necessary to form a structure on a region where a structure of a target object is absent. In this case, a support member that supports the structure is provided on the lower side of the structure in the direction of gravity. That is, the support member is formed in the region where the target object is absent in the course of the build-up, as needed.

The support member is unnecessary for the target object and thus removed after the completion of the build-up. Accordingly, the support member is desirably composed of a material that can be easily removed from a surface of the structure composed of a structural material.

In PTL 1, a laminated article is formed of particles (support material particles) containing a material constituting a support member and particles (structural material particles) containing a material that constitutes the target object and that is composed of a resin having a higher softening temperature than the support material particles after the build-up of the laminated article. After the build-up of the laminated article, the laminated article is heated to a temperature which is equal to or higher than the melting temperature of the support material particles and at which the structure is not melted to selectively melt and remove the support member, thereby providing the structure, i.e., the target object.

PTL 2 discloses a formation process with particles each including a core composed of metal, ceramic, plastic, or the like, a first coating film on the core, the first coating film being composed of a polar material, and a second coating film on the first coating film, the second coating film being composed of a surfactant. In PTL 2, steps of disposing a layer composed of the particles on a base and spraying a liquid binder on the layer, the liquid binder dissolving the first and the second coating films, or irradiating the layer with a laser beam according to a predetermined pattern are repeated to bind the particles together, thereby building up an object. A region of the particles that have not been sprayed with the liquid binder or not irradiated with the laser beam and thus are not fused with each other serves as a support member and supports a laminate of the particles to be formed into a structure.

CITATION LIST

Patent Literature

PTL 1 Japanese Patent Laid-Open No. 2003-53849
PTL 2 PCT Japanese Translation Patent Publication No. 2005-533877

In the method described in PTL 1, however, the support member can be left on a surface of the structure, and the structure can be deformed by heat applied at the time of removal of the support member to fail to obtain a desired object.

In the case of PTL 2, the structure is fixed by the fusion of the first coating film, which is a surface layer, at contact points between the particles. Thus, its bonding is weak, so that the target object can be broken by a load on the structure at the time of removal of the support member.

SUMMARY OF INVENTION

To solve the foregoing problems, the present invention aims to provide constituent particles that are preferably used to form a support member, the constituent particles inhibiting the deformation of a structure and being easily removed from a surface of a structure with a water-containing solvent, and a method for producing a three-dimensional object with the constituent particles.

According to an aspect of the present invention, constituent particles each containing at least one water-soluble material and each include a core and a shell that covers at least part of a surface of the core, the core containing the at least one water-soluble material most abundantly, and a material contained in the shell most abundantly having a lower water solubility than the at least one water-soluble material in the core.

Further features of the present invention will become apparent from the following description of exemplary embodiments with reference to the attached drawings.

DESCRIPTION OF EMBODIMENTS

Figure 1:
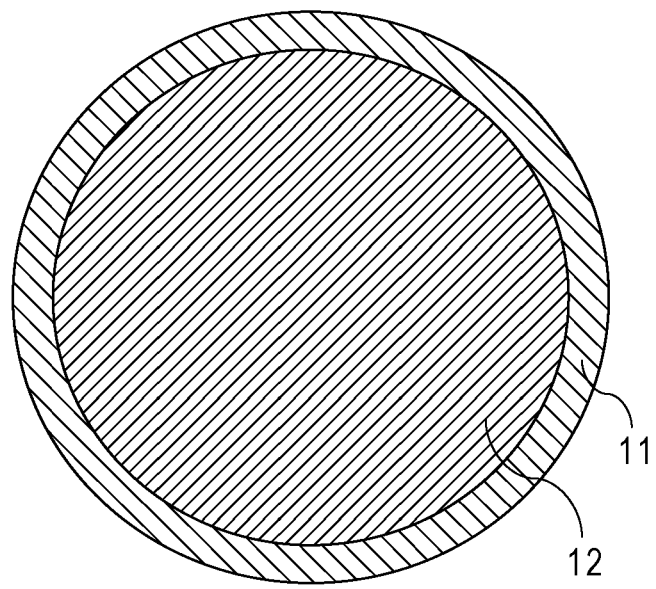
FIG. 1 illustrates a constituent particle according to an embodiment of the present invention.

The present invention will hereinafter be described in detail with reference to the attached drawings. In each of the drawings, the same or equivalent members are designated using the same reference numerals. Publicly or generally known technology in this technical field may be applied to structures and steps that are not particularly illustrated or described. Descriptions are not redundantly repeated, in some cases.

Constituent Particles

Typically, target objects are often produced with a water-insoluble material, such as acrylonitrile-butadiene-styrene (ABS) or nylon. Thus, when support material particles are soluble in water, a support member can be selectively removed using a difference in water solubility. When the support member can be removed with water, the use of water is significantly preferred because of a high level of safety and a low environmental load of water in addition to a low cost of water owing to its easy availability. The term "water-insoluble" used here refers to a property in which the solubility of a substance in water is less than 0.1. The term "soluble in water" refers to a property in which the solubility of a substance is 0.1 or more. The term "water solubility" refers to the value of the mass of a substance dissolved in 100 g of deionized water with a temperature of 20° C. at 1 atm, the value being expressed in units of g.

The support member is preferably composed of a water-soluble material having high water solubility in view of removal efficiency with water. When particles composed of the water-soluble material having high water solubility are exposed to a high-humidity atmosphere, the particles absorb moisture in the atmosphere to increase the surface stickiness thereof. Constituent particles are accommodated in a material reservoir of an apparatus for producing an object. If a powder contains such particles, the powder aggregates upon exposure to humidity, thereby significantly reducing the flowability. The powder having significantly reduced flowability might lead to operational failures in a formation process and a reduction in the accuracy of a target object. Thus, humidity in environments used during the storage and use of the powder needs to be strictly controlled, resulting in a low level of convenience and high production costs.

Constituent particles according to an embodiment of the present invention each include a shell 11 on a surface of a core 12 as depicted in FIG. 1 which illustrates a cross-sectional structure. Unlike FIG. 1, the core need not be completely covered with the shell. Each of the constituent particles according to an embodiment of the present invention may include the core 12 and the shell 11 that covers at least part of the surface of the core 12. The core 12 contains a water-soluble material most abundantly. A material contained in the shell 11 most abundantly has a lower water solubility than the water-soluble material in the core 12. The solubility of each of the core 12 and the shell 11 can be measured as follows: the shell 11 and the core 12 are separated from the particle, and then the shell 11 and the core 12 are separately subjected to solubility measurement.

In the constituent particles each having such a structure, the material of the core can be exposed at a surface of the particle by application of thermal energy or thermal energy and pressure under appropriate conditions, depending on the coverage of the surface of the core by the shell and materials of the core and the shell. For example, the material of the core can be exposed at the surface by heating the particles to a temperature equal to or higher than the softening temperature of the core or the constituent particle or by heating the constituent particles to a temperature equal to or higher than the softening temperature of the core or the constituent particle and simultaneously, pressing the constituent particles to break the structure of the shell. Here, the term "softening temperature" used in an embodiment of the present invention refers to a temperature at which a loss modulus determined in measuring dynamic viscoelasticity is $10^8$ Pa or less. The phrase "the softening temperature of the constituent particle" refers to a temperature at which the loss modulus of the constituent particle including the core and the shell is $10^8$ Pa or less.

Alternatively, the material of the core can be exposed by spraying the constituent particle with a solution that selectively dissolves the material of the shell to localize the material of the shell with the help of the surface tension of a droplet on the particle surface.

Because each of the constituent particles according to an embodiment of the present invention has the surface composed of a material (shell 11) having low water solubility as described above, even when the constituent particles in the form of powder is in a high-humidity atmosphere, aggregation due to moisture absorption is inhibited to suppress a reduction in flowability. Thus, a powder state appropriate for an additive manufacturing process can be maintained without control of humidity.

In a production process of a three-dimensional object, by pressing and heating the constituent particles to a temperature equal to or higher than the softening temperature of the core or the constituent particle, the core material portions are pushed from the insides of the constituent particles and then fused together, thereby forming the three-dimensional object. Alternatively, in a production process of a three-dimensional object, by spraying a solution that selectively dissolves the shell and then performing drying, the particles are bonded together with the material of the shell while the core material is exposed, thereby forming the three-dimensional object.

Because the core contains the water-soluble material most abundantly, the water-soluble material can be dissolved by bringing the core into contact with water to collapse a formed item.

The constituent particles according to an embodiment of the present invention are suitable as support material particles because of the foregoing properties. In the case where the constituent particles according to an embodiment of the present invention are used as the support material particles, a support member can be easily removed by bringing the support member into contact with water after the completion of the formation. Thus, a high-accuracy three-dimensional object can be produced without impairing the form of a structure in the step of removing the support member. The term "easily" indicates that at least one of the following two points is satisfied: a short period of time required for the removal; and no need for a special operation or environment.

To achieve high removal efficiency of the support member, the support member desirably has a structure in which a three-dimensional network structure composed of the water-soluble material of the core is dotted with the water-insoluble material of the shell. To this end, the core 12 needs to contain the water-soluble material in an amount required to form the three-dimensional network structure composed of the water-soluble material. Thus, a percentage by volume of the core 12 is preferably 50% or more and more preferably 70% or more with respect to the entire constituent particle. Alternatively, a percentage by mass of the water-soluble material contained in the core of each of the support material particles is preferably 50% or more and more preferably 70% or more with respect to the entire core 12, depending on the specific gravities of materials contained in the core and the shell.

As the water-soluble material contained in the core 12, a single type of water-soluble material or different types of water-soluble materials may be used. In the case where the different types of water-soluble materials are contained, the total amount of the different types of water-soluble materials corresponds to the amount of the water-soluble material contained in the core 12. Accordingly, the percentage by volume or mass of the water-soluble material with respect to the entire core 12 may be calculated from the total amount of the different types of water-soluble materials. The type of water-soluble material used here is determined on the basis of a chemical structure. When the water-soluble materials have different chemical structures, the water-soluble materials are expressed as "different types of water-soluble materials".

In the case where the different types of water-soluble materials are contained in the core 12, the clause "the material contained in the shell most abundantly having a lower water solubility than the water-soluble material contained in the core" indicates that the material contained in the shell most abundantly has a lower water solubility than any of the water-soluble materials in the core.

The water-soluble material contained in the core is not limited as long as it has a water solubility. The water-soluble material contained in the core preferably has a water solubility more than 1, more preferably more than 5, and still more preferably 10 or more.

Examples of the water-soluble material that may be used include elementary substances, compounds, and composites thereof. Specific preferred examples thereof include water-soluble inorganic materials, water-soluble dietary fiber, water-soluble carbohydrate such as saccharide, poly(alkylene oxide), poly(vinyl alcohol) (PVA), and poly(ethylene glycol) (PEG). Specific examples of water-soluble dietary fiber include polydextrose and inulin. Specific examples of carbohydrate include sucrose, lactose, maltose, trehalose, melezitose, stachyose, and maltotetraose. A specific example of poly(alkylene oxide) is poly(ethylene glycol) (PEG).

The core may contain a water-insoluble material. The water-insoluble material is preferably, but not limited to, a material that modifies the properties of the constituent particles, depending on an additive manufacturing process employed.

For example, in the case of particles used in a formation process in which lamination is performed by heating and pressing, a viscoelasticity modifier that modifies viscoelasticity at the time of heating and pressing may be added. The viscoelasticity modifier preferably has a smaller size than the particle diameter of the constituent particles.

As a modifier that increases viscoelasticity, a material in the form of fibers is preferred to impede the motion of the main component of the core during viscous flow. Examples of the material in the form of fibers include water-insoluble fibers having a nanoscale diameter or length (hereinafter, referred to as "nanofibers"). The incorporation of the nanofibers into the main component of the core forms a nanofiber matrix in a base material. This facilitates an increase in the viscoelasticity of the base material.

As a modifier that reduces viscoelasticity, a plasticizer that improves the motion of the core during viscous flow may be used.

In the case of particles used for a formation process in which lamination is performed by an electrophotographic process, a charge control agent may be added in order to control chargeability.

As a charge control agent that allows particles to have negative chargeability, organometallic compounds and chelate compounds are effective. Specific examples thereof include monoazo metal compounds, metal acetylacetonate compounds, and metal compounds of aromatic hydroxycarboxylic acids, aromatic dicarboxylic acid, and hydroxycarboxylic acids, and dicarboxylic acids. Also preferred are aromatic hydroxycarboxylic acids, aromatic mono- and poly-carboxylic acids, and metal salts thereof, anhydrides, esters, and phenol derivatives such as bisphenols. Furthermore, urea derivatives, metal-containing salicylic-based compounds, metal-containing naphthoic acid-based compounds, boron compounds, quaternary ammonium salts, calixarenes, resin-based charge control agents, and so forth may be used.

As a charge control agent that allows particles to have positive chargeability, nigrosines, nigrosines modified by metal salts of aliphatic acids, guanidine compounds, imidazole compounds, quaternary ammonium salts, such as tributylbenzylammonium-1-hydroxy-4-naphthosulfonate and tetrabutylammonium tetrafluoroborate, and lake pigments thereof may be used. Triphenylmethane dyes, lake pigments thereof, metal salts of higher fatty acids, and resin-based charge control agents are also preferred. As lake formers, phosphotungstic acid, phosphomolybdic acid, phosphotungstomolybdic acid, tannic acid, lauric acid, gallic acid, ferricyanide, and ferrocyanide may be used.

These charge control agents may be contained in each constituent particle alone or in combination of two or more.

The material contained in the shell most abundantly is not limited as long as it has a lower water solubility than the water-soluble material contained in the core, and preferably has a water solubility less than 10, more preferably less than 5, and still more preferably 1 or less.

Examples of the material contained in the shell most abundantly include, but are not limited to, organic substances, such as organic compounds and (macromolecular compounds, inorganic substances, such as metals and ceramics, and organic-inorganic hybrid materials containing organic substances and inorganic substances.

As the organic substances, specifically, resin substances, such as acrylic-based resins, vinyl-based resins, polyester resins, epoxy resins, and urethane resins, ester compounds, such as fatty acid esters of glycerol, fatty acid esters of sucrose, and fatty acid esters of sorbitan, and some cellulose derivatives, such as ethyl cellulose, can be preferably used.

As the inorganic substances, inorganic oxides, such as silicon oxide, titanium oxide, and alumina, can be preferably used. Furthermore, materials having structures in which fluorine is directly bonded to these inorganic oxides are preferably used.

As the organic-inorganic hybrid materials, a compound including a main skeleton composed of a siloxane bond and at least one side chain composed of an organic group is preferably used. The organic group used here desirably has the effect of imparting hydrophobicity to the shell. Examples thereof include alkyl and fluoroalkyl groups. As such an organic-inorganic hybrid material, silicone in which the organic group is a methyl group is preferred in view of easy availability.

The shell may contain a material that modifies the properties of the constituent particles, depending on an additive manufacturing process employed. As with the core, in the case of particles used in a formation process in which lamination is performed by heating and pressing, a viscoelasticity modifier that modifies viscoelasticity at the time of heating and pressing may be contained. In the case of particles used for a formation process in which lamination is performed by an electrophotographic process, a charge control agent may be contained. When the shell contains the charge control agent, charging can be controlled during triboelectrification. As the viscoelasticity modifier and the charge control agent added to the shell, the same materials as used for the core can be used.

In the case of the particles used in the formation process using the electrophotographic process, the shell material has a volume resistivity more than $10^{-3}$ Ω·cm and preferably more than $10^9$ Ω·cm. A volume resistivity more than $10^{-3}$ Ω·cm results in a small amount of charge decay, so that the particles can be satisfactorily used.

The main component of the core and the main component of the shell are preferably different from each other. In the case where the main component of the core and the main component of the shell are different from each other, the formation of the three-dimensional network composed of the water-soluble material in the core is promoted at the time of fusion of the particles to facilitate dissolution or collapse of the support member by the use of water. The term "main component" used in an embodiment of the present invention refers to a component whose content by mass is highest in components contained in each member.

Each of the constituent particles according to an embodiment of the present invention preferably has a water-soluble material content of 70% or more. At a water-soluble material content of 70% or more, the water-soluble material tends to be easily removed with water.

The thickness of the shell is preferably 0.0010% or more and 15% or less and more preferably 1.0% or less of the particle diameter. Specifically, the shell thickness is preferably 1 nm or more and 10 μm or less and more preferably 10 nm or more and 1 μm or less. At a shell thickness less than 1 nm, water penetrates easily into the core, and the strength of the shell tends to be low; hence, sufficient moisture resistance can fail to be provided. At a shell thickness more than 10 μm, a formed item is less prone to be dissolved or collapsed.

The thickness of the shell can be measured by an existing technique, for example, a technique for using a cross-sectional image of the particles observed under an electron microscope, a transmission electron microscope (TEM), or the like, or an elemental mapping technique.

In the technique for using a cross-sectional image of the particles observed under an electron microscope, a transmission electron microscope (TEM), or the like, the thickness and the percentage of the thickness of a portion of the shell with respect to the particle diameter can be measured by breaking freely selected constituent particles and observing cross-sections of the particles. The thickness of the shell is measured at five or more points of one particle, and the resulting thickness values are averaged. Then 10 or more particles are subjected to the shell thickness measurement. The average value of the shell thickness of the constituent particles is calculated and used as the shell thickness.

When the core and the shell are not distinguished from each other under the electron microscope or TEM, the elemental mapping technique may be useful. Specifically, a difference in material between the core and the shell can be visualized by X-ray photoelectron spectroscopy (XPS), time-of-flight secondary ion mass spectrometry (TOF-SIMS), energy dispersive X-ray spectroscopy (EDX), Auger electron spectroscopy (AES), or the like.

In an embodiment of the present invention, unlike FIG. 1, the core need not be completely covered with the shell. Part of the core may not be covered with the shell. The coverage of the surface area of the core by the shell is preferably 30% or more and more preferably 40% or more. At a coverage less than 30%, the flowability-maintaining effect of the shell on the powder is not provided in an environment in which humidity is not controlled, in some cases.

In an embodiment of the present invention, the coverage by the shell is preferably 95% or less. At a coverage of 95% or less easily, the exposure of the core is easily promoted during formation, and the removal rate with water tends to be high.

The coverage by the shell is determined as follows: A cross-section of a particle is divided into 10 or more regions in such a manner that particle surface portions have substantially the same area. An image of each of the divided regions is captured with a microscope or the like. The percentage of a region where the shell is present, i.e., the percentage of the shell present, is calculated from the resulting image. The average of the resulting percentages is calculated and used as the coverage. As the microscope, for example, an electron microscope can be used. To identify regions of the shell and the core, the particles can be stained, as needed.

When the shell portion is not observed under the microscope, the following method is useful: After separation of the core and shell, a core component and a shell component are identified, and then the coverage is calculated from the percentages of the core component and the shell component present. As a method for separating the shell from the core, a method for mechanically separating the shell or a method in which selective dissolution is performed with a solvent or the like, and then reprecipitation is performed can be employed. For example, a solvent that only dissolves the shell is selected. The shell is selectively dissolved. After a core portion is removed, the shell component is precipitated. The shell component and the core portion are subjected to composition analysis. Regarding the core portion, the core portion may be subjected to composition analysis using the cross section of the particle. Letting the resulting amount of the shell component be 100%, and letting the amount of the component in the core be 0%, a calibration curve is plotted. The surface of the particle is subjected to composition analysis. The coverage can be calculated from the resulting amount of the component using the calibration curve.

The constituent particles can be prepared by a known method. A method for simultaneously forming a core and a shell may be employed. A method for forming a shell on a core produced in advance may also be employed. In the case of simultaneously forming the core and the shell, a suspension polymerization method, an emulsion polymerization method, and so forth may be used.

In the case of forming the shell on the core produced in advance, a phase separation method, an in-liquid drying method, a melt dispersion cooling method, a spray drying method, a pan coating method, an interfacial polymerization method, a coating-film method by curing in a liquid, a covering method with suspension in a gas, a mechanofusion method, a mechanochemical method, and so forth may be employed. To produce the core, a mechanical pulverization method, a spray drying method and a melt dispersion cooling method in which a material in a solution or molten state is allowed to disperse in a gas (liquid) medium and cooled into particles, a chemical polymerization method such as a suspension polymerization method in which polymerized particles are prepared in a medium, and so forth may be employed. Of these, a production method using a medium is preferred because the form of the particles and the particle size distribution of a powder are relatively freely controlled. In particular, the spray drying method is preferred.

The resulting powder is classified, as needed. Regarding classification, sieve classification, pneumatic classification with an elbow jet classifier, or the like may be appropriately selected. To obtain a desired average particle diameter and a desired particle size distribution, different classifiers may be used in combination. The classification may be performed multiple times.

Method for Producing Three-Dimensional Object

An exemplary method for producing a water-insoluble three-dimensional object by an additive manufacturing process while a support member that is composed of the constituent particles serving as the support material particles according to an embodiment of the present invention and that can be removed with water after formation is formed will be described below. Properties of the constituent particles required in the additive manufacturing process will also be described. In the formation method described below, the constituent particles are used as a powder. The powder may contain particles other than the constituent particles according to an embodiment of the present invention as long as it contains the constituent particles. To sufficiently provide the advantageous effects of the present invention, the particles other than the constituent particles of an embodiment of the present invention is preferably contained in the powder in an amount of 5% or less.

In the method for producing a three-dimensional object according to this embodiment, water-insoluble structural material particles and support material particles having a structure illustrated in FIG. 1 are used as the constituent particles, the method including the steps (I) to (III):
(I) the step of forming a particle layer by disposing the structural material particles and the support material particles;
(II) the step of forming an item by laminating the particle layers; and
(III) the step of removing a support member in the item by bringing the support member into contact with a water-containing solvent.

The steps (I) and (II) are repeated to laminate the particle layers as many as required, thereby forming the item. The support member is selectively removed by subjecting the item to the step (III), thereby providing the target three-dimensional object.

These steps will be described in detail below.

(I) Step of Forming Particle Layer by Disposing Structural Material Particles and Support Material Particles In this step, the structural material particles and the support material particles are disposed to form the particle layer on the basis of the three-dimensional data of the target object. Specifically, three-dimensional data is generated by adding the data of the support member required in the course of the formation to the three-dimensional data of the target object. The three-dimensional data including the data of the support member is sliced at a predetermined spacing to generate slice data. The structural material particles and the support material particles are disposed according to the slice data, thereby forming the particle layer.

As will be described below, in the case where the particles are fused together by application of thermal energy in the step (II) of laminating the particle layer, the constituent particles preferably contain a thermoplastic material. The term "thermoplastic material" refers to a material having properties in which although the material is not easily deformed at ordinary temperature, the material exhibits plasticity upon heating to a temperature depending on the material and can be freely deformed, and the material hardens again upon cooling. As the thermoplastic material contained in the structural material particles, any known material having the foregoing properties may be used. Examples thereof include thermoplastic resins, such as ABS, polypropylene (PP), polyethylene (PE), polystyrene (PS), poly(methyl methacrylate) (PMMA, what is called acrylic), poly(ethylene terephthalate) (PET), poly(phenylene ether) (PPE), polyamide (PA) such as nylon, polycarbonate (PC), polyacetal such as polyoxymethylene (POM), poly(butylene terephthalate) (PBT), poly(phenylene sulfide) (PPS), poly (ether ether ketone) (PEEK), liquid crystal polymers (LCPs), fluororesins, urethane resins, elastomers, poly(vinyl alcohol) (PVA), and poly(ethylene glycol) (PEG). Additional examples thereof include metals and inorganic materials. These materials may be used separately or in combination as a mixture.

As the thermoplastic material contained in the support material particles, an inorganic material, dietary fiber, carbohydrate such as saccharide, poly(alkylene oxide), poly (vinyl alcohol) (PVA), or poly(ethylene glycol) (PEG) is preferred. Specific examples of water-soluble dietary fiber include polydextrose and inulin. Specific examples of saccharide include sucrose, lactose, maltose, trehalose, melezitose, stachyose, and maltotetraose. A specific example of poly(alkylene oxide) is poly(ethylene glycol) (PEG).

A material contained in the structural material particles may be selected, depending on a function of the target object required, and may contain a functional material such as a pigment.

The softening temperature and the melting temperature of the material contained in the structural material particles may be appropriately selected, depending on a temperature at which the particle layer is fused in the subsequent lamination step (II), and are preferably 40° C. or higher and 300° C. or lower. At 40° C. or higher, the formed item is less prone to be deformed. At 300° C. or lower, a melting operation in the step (II) is easily controlled.

A method for forming the particle layer is preferably, but not necessarily, a method in which the particles are arranged in a line-by-line or plane-by-plane manner, in view of the rate of formation. To form the particle layer by arranging the constituent particles in a line-by-line or plane-by-plane manner, a known method such as a method using electrostatic action due to electrification may be employed.

When the particle layer including different constituent particles is formed as described in this embodiment, an electrophotographic process is particularly preferably employed. In this method, each type of particles is disposed at positions specified by the slice data with photosensitive members in a number corresponding to the number of types of particles used for the formation, thereby forming an accurate particle layer.

In the case where the constituent particles, illustrated in FIG. 1, according to an embodiment of the present invention are used in an additive manufacturing process using the electrophotographic process, the charge decay, which is a problem that arises in the constituent particles containing the water-soluble material, is suppressed.

The water-soluble material is typically hydrophilic. Thus, the adsorption of water in air on its surface can allow the amount of charge of a charged particle to decay. Unlike an embodiment of the present invention, in the case where the electrophotographic process is performed with particles that are composed of a water-soluble material and that do not have a shell, the amount of charge can decay in the course of the formation of a particle layer to fail to dispose the particles at predetermined positions. In contrast, in the case of the particles having the structure illustrated in FIG. 1, absorption of water on the surface of the water-soluble material is inhibited by the shell, thus suppressing the decay of the amount of charge.

The decay rate $\alpha$ of the surface potential of each of the constituent particles is preferably less than 0.3, more preferably 0.2 or less, and still more preferably 0.1 or less. At a decay rate $\alpha$ less than 0.3, each of the charged particles keeps the charge; hence, the particle layer can be formed by the electrophotographic process. At a decay rate $\alpha$ of 0.1 or less, the amount of charge can be stably maintained. Thus, the constituent particles having such a decay rate $\alpha$ are more preferably used in the electrophotographic process. The amount of charge and the decay rate $\alpha$ can be adjusted to desired values by appropriately selecting the material and the thickness of the shell.

Furthermore, the presence of the shell inhibits a change in the stickiness of the particle due to water adsorption by the core, maintaining the flowability of the powder. Thus, an increase in the number of contacts between particles seemingly enables the initial amount of charge to be sufficiently obtained.

(II) Step of Forming Item by Laminating Particle Layer

This step is a step of repeatedly laminating the particle layers formed in the step (I) to form an item. Regarding the lamination of the particle layers, a separately formed particle layer may be laminated on a surface of a particle layer that has been previously formed. Alternatively, the lamination may be performed by directly forming a new particle layer on a surface of a particle layer that has been previously formed. In the case where the separately formed particle layer is laminated on the surface of the particle layer that has been previously formed, a particle layer may be temporarily formed on a base member and then transferred to the surface of the particle layer that has been previously formed. The base member used here is referred to as a transfer member. When the particle layer is formed on the transfer member, a known transfer method, such as electrostatic image transfer using an electrostatic force, may be employed.

The fusion of the particles constituting the particle layer may be performed before the lamination, simultaneously with the lamination, or after the lamination. Furthermore, the fusion may be performed at multiple timings selected from them. For example, a method selected from (i) to (iii) may be employed.

Figure 2A:
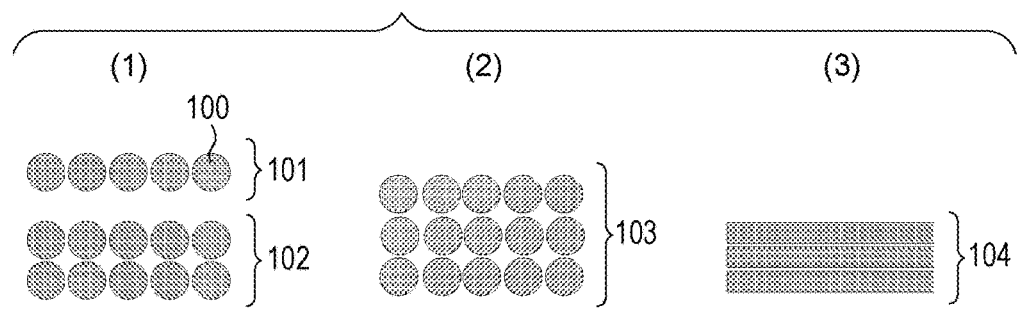
FIGS. 2A to 2C schematically illustrate steps of laminating particle layers.

(i) Method in which after Lamination of Particle Layers, Constituent Particles are Fused Together As illustrated in (1) and (2) of FIG. 2A, a particle layer 101 formed of constituent particles 100 is laminated on laminated particle layers 102 that have been previously formed, thereby forming laminated particle layers 103. The constituent particles 100 are melted and fused together by application of thermal energy to the laminated particle layers 103, thereby forming an item 104 as illustrated in (3) of FIG. 2A.

Figure 2B:
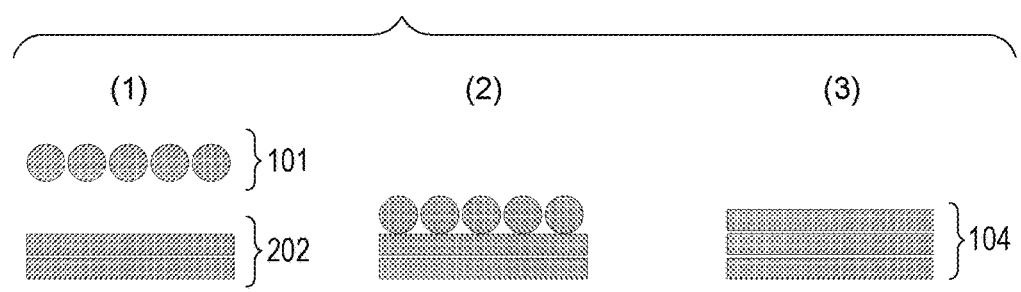

(ii) Method in which Constituent Particles are Fused Every Time Single Particle Layer is Laminated As illustrated in (1) and (2) of FIG. 2B, the particle layer 101 formed of the constituent particles 100 is laminated on a formed item 202 that has been previously formed and that is formed of particle layers, and simultaneously, thermal energy is applied to a lamination plane between the particle layer 101 and the formed item 202. The constituent particles 100 are melted, fused together, and simultaneously fused to the formed item 202, thereby forming the item 104 formed of the particle layer 101 and the formed item 202, as illustrated in (3) of FIG. 2B. This method is preferred because the number of the constituent particles in the particle layers is smaller than that in (i) and thus voids are less likely to be formed in the formed item 202.

Figure 2C:
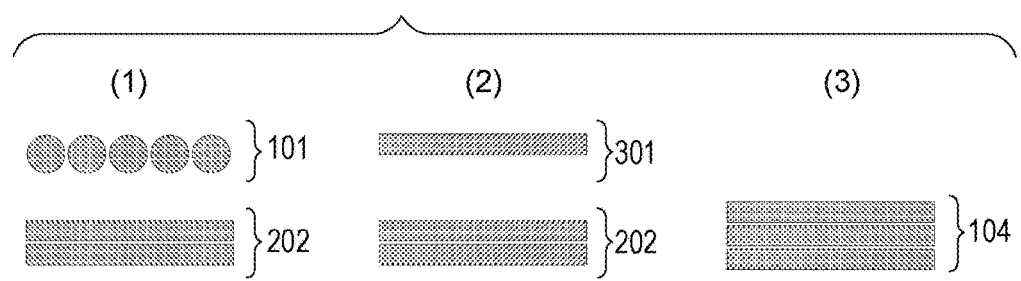
Figure 3:
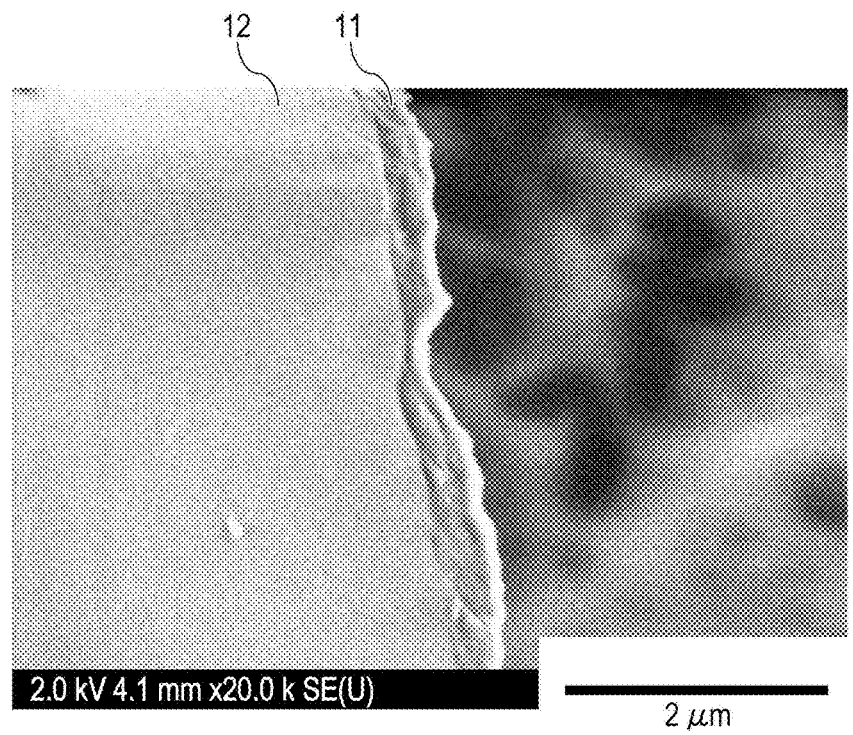
FIG. 3 is an electron micrograph of a cross section of powder N prepared in an example of the present invention.

(iii) Method in which Constituent Particles in Particle Layer are Fused Together Prior to Lamination As illustrated in (1) and (2) of FIG. 2C, thermal energy is applied every time the particle layer 101 is formed in such a manner that the temperature is equal to or higher than the softening temperature of the core, thereby fusing the constituent particles 100 together into a sheet. A particle layer 301 in the form of a sheet is laminated on the formed item 202, and simultaneously, thermal energy is applied to a lamination plane between the particle layer 301 in the form of a sheet and the formed item 202.

The particle layer 301 in the form of a sheet is fused to the formed item 202 to form the item 104 formed of the particle layer 301 in the form of a sheet and the formed item 202, as illustrated in (3) of FIG. 2C. As with (ii), this method is also preferred because voids are less likely to be formed in the formed item 202.

In (i) to (iii) described above, the case where thermal energy is used to fuse the constituent particles together has been described. A method in which the constituent particles are chemically fused using a chemical agent may also be employed. However, the methods in which the constituent particles are fused by application of thermal energy are preferred because they are highly effective in reducing voids by applying energy over the whole region of the particle layers to allow the fusion of the particles to proceed in the whole.

(III) Step of Removing Support Member in Item by Bringing Support Member into Contact with Water-Containing Solvent The item formed by repeating steps (I) and (II) as many times as needed is brought into contact with the water-containing solvent. The item is brought into contact with the water-containing solvent by immersing the whole of the item in the solvent or showering the solvent on the item.

When the item is bought into contact with the water-containing solvent, the water-soluble material in the support member is eluted. Although the debris of the shell in the support member is not easily dissolved because of its low water solubility, the debris is removed together with the water-soluble material from the structure. Because the structure is composed of the water-insoluble material, there is no possibility that the structure is dissolved in the water-containing solvent or is deformed by the removal of the support member.

In the case where the support member is removed by immersing the whole of the item in the solvent, the application of a stream or ultrasonic vibration to the solvent promotes the dissolution or collapse of the support member and is thus preferred.

The constituent particles according to an embodiment of the present invention have high moisture resistance in the form of particles and can be dissolved or collapsed by the use of water after the formation of the item. To achieve the properties, it is preferable to obtain, through a formation process, a state in which the composition of chemical species on a surface of the formed item is different from the composition of chemical species on a surface of each particle prior to the formation of the item. More preferably, different main chemical species are exposed. In this case, material components exposed at the item surface differ from those exposed at the particle surface. This suggests that the difference in material component is caused through the formation process.

As a method for analyzing the main chemical species, a method such as existing surface elemental analysis may be employed. Examples of the method that may be employed include X-ray photoelectron spectroscopy (XPS), time-of-flight secondary ion mass spectrometry (TOF-SIMS), energy dispersive X-ray spectroscopy (EDX), and Auger electron spectroscopy (AES).

The particles and the item may be subjected to the surface elemental analysis to assess the difference in the main surface chemical species. Specifically, the surface chemical species can be analyzed for a difference in the type of element, elemental compositions, and so forth.

The change of the material components exposed at the surface of the formed item with respect to the form of particles is seemingly caused by the deformation of each particle due to the temperature or the temperature and the pressure applied to the constituent particles in the formation process.

Conditions for the change of the material components exposed at the surface of the formed item with respect to the form of particles vary depending on the coverage of the surface of the core in the form of a particle by the shell and the combination of materials of the core and the shell. For example, in the case where the coverage by the shell is substantially 100%, the particles may be deformed by heating the particles to a temperature equal to or higher than the softening temperature of the core or the constituent particle and simultaneously, pressing the particles so as to have a height corresponding to a deformation ratio of 90% or less. In this case, the shell is broken to allow the material in the core to be easily exposed at the surface, thus providing the advantageous effect more preferably.

To determine the degree of deformation in the formation process from the formed item, the ratio of a value obtained by dividing the thickness of the formed item by the number of the particle layers laminated to the thickness of the particle layer may be approximated. Thereby, the degree of deformation applied to the particles in one lamination can be estimated. In the case where the deformation of the particle can be observed, the particle is directly observed, and the height of the particle after pressing with respect to the average particle diameter of the particles prior to the formation may be defined as the deformation ratio.

The average particle diameter on a volume basis (hereinafter, referred to simply as an "average particle diameter") of the constituent particles constituting the powder used for the foregoing formation method is preferably 1 μm or more and 100 μm or less and more preferably 20 μm or more and 80 μm or less. When the particles have an average particle diameter of 1 μm or more, the particle layer used for one lamination can have a large thickness, it is thus possible to form an item having a desired height in a small number of laminating operations. When the particles have an average particle diameter of 100 μm or less, a high-accuracy item is easily formed.

The average particle diameter of the constituent particle constituting the powder used for the formation can be determined with a commercially available particle size distribution analyzer. For example, when a laser diffraction/scattering particle size distribution analyzer LA-950 (HORIBA, Ltd.) is used, the average particle diameter can be measured as described below. The setting of measurement conditions and analysis of measured data are performed using accompanying dedicated software.

A batch cell containing a measurement solvent is placed on the analyzer, and an optical axis and a background are adjusted. As the solvent used here, a solvent in which the particles are little dissolved needs to be selected. To improve the dispersibility of the particles measured, a dispersant may be appropriately added to the solvent, as needed. A powder formed of the target particles to be measured is added to the batch cell until the transmittance of light emitted from a tungsten lamp reaches 90% to 95%, and then the particle size distribution is measured. The average particle diameter on a volume basis can be calculated from the resulting measurement results.

The constituent particles preferably have an average circularity of 0.85 or more and more preferably 0.90 or more. When the particles have an average circularity of 0.85 or more, the particles are in a point contact manner, so that the particles flow easily, closest packed arrangement is easily obtained in the particle layer, and voids are less likely to be formed at the time of lamination.

The average circularity can be determined as described below. The circularity of each particle is defined as follows:

Circularity=(circumferential length of circle having the same area as projected area of particle)/(circumferential length of projected image of particle)

The term "projected area of particle" is defined as the area of a binarized particle image. The term "circumferential length of projected image of particle" is defined as the length of the outline of the image of the particle. The circularity serves as an index to the degree of irregularity of the projected image of the particle. The circularity indicates 1.0 when the particle has a completely spherical form. A higher degree of complexity of the surface form results in a lower circularity value.

The circularity of the particles can be measured by the image processing of an image observed under an electron microscope or the like and a flow-type particle image analyzer. The average circularity can be determined by subjecting freely-selected 10 or more constituent particles to circularity measurement and averaging the resulting values of circularity.

Formation Apparatus

Figure 7:
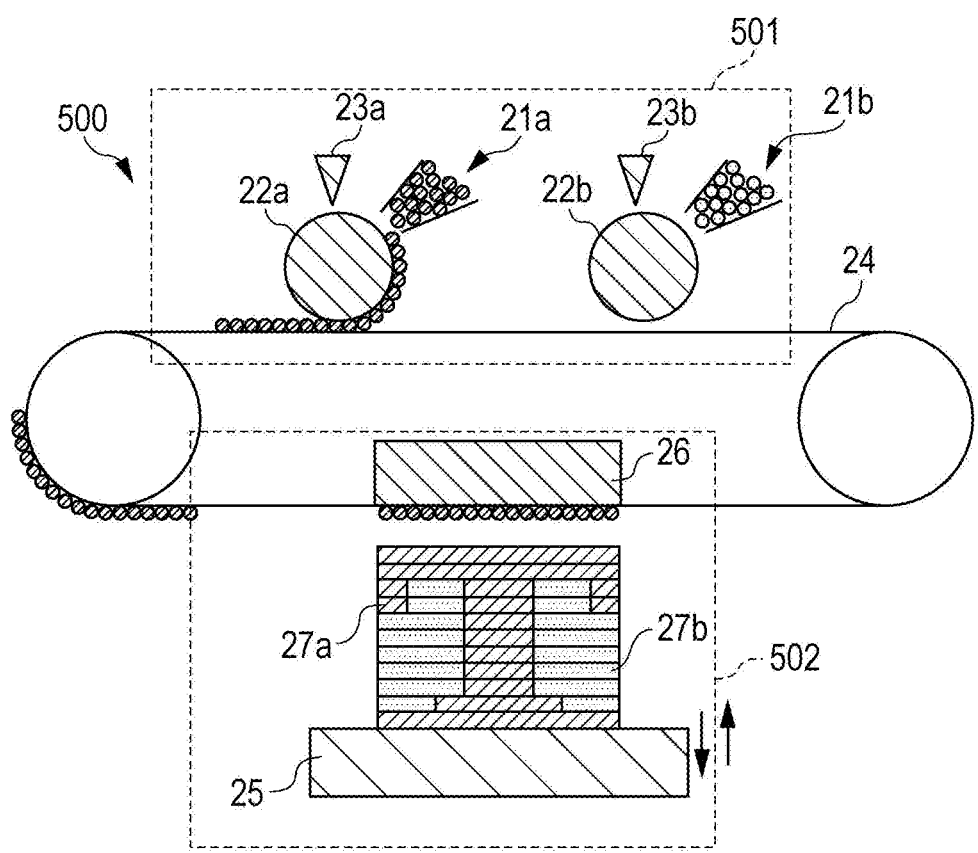
FIG. 7 is a schematic diagram of an apparatus for producing a three-dimensional object by an electrophotographic process.

A preferred formation apparatus using the constituent particles according to an embodiment of the present invention will be described below. For example, a formation apparatus 500 illustrated in FIG. 7 is preferably used in the electrophotographic process.

The formation apparatus 500 includes a particle layer formation section 501, an object formation section 502, and a transfer member 24 that connects the particle layer formation section to the object formation section.

The particle layer formation section 501 includes, depending on the number of types of constituent particles, a material supply portion 21, a photosensitive member 22, and a light source (not illustrated). A particle layer is formed on the transfer member 24. FIG. 7 illustrates a structure when a single type of structural material particles and a single type of support material particles are used. The number of a set of the material supply portion 21, the photosensitive member 22, and the light source included in the particle layer formation section 501 may be increased, depending on the number of types of constituent particles.

A particle layer formed of the structural material particles and a particle layer formed of the support material particles are respectively formed on photosensitive members 22a and 22b. The photosensitive member 22a is scanned with laser light 23a emitted from the light source to form a latent image on the photosensitive member 22a. The photosensitive member 22b is scanned with layer light 23b emitted from the light source to form a latent image on the photosensitive member 22b. Specifically, a latent image of a structural portion according to the slice data is formed on the photosensitive member 22a, and a latent image of a support member portion according to the slice data is formed on the photosensitive member 22b.

A material supply portion 21a contains a powder including the structural material particles. A material supply portion 21b contains a powder including the support material particles. The structural material particles are supplied from the material supply portion 21a to the photosensitive member 22a to form a layer formed of the structural material particles on the photosensitive member 22a. The support material particles are supplied from the material supply portion 21b to the photosensitive member 22b to form a layer formed of the support material particles on the photosensitive member 22b. The layer on the photosensitive member 22a and the layer on the photosensitive member 22b are electrostatically transferred, in sequence, to the transfer member 24 to form a particle layer formed of the structural material particles and the support material particles. The order in which the particle layers are transferred to the transfer member 24 is not limited to the foregoing order. After the transfer of one of the particle layers formed of the structural material particles and the support material particles, the other particle layer may be transferred.

The particle layer formed on the transfer member 24 is heated, transferred to, and laminated on a partially formed item on a stage 25. At the time of lamination, the partially formed item and the heated particle layer can be sandwiched and pressed between a counter member 26 and the stage 25. The particle layer may be heated by the counter member 26 with a built-in heater or may be heated by a heating means different from the counter member 26. An item including a structural portion 27a formed of the structural material particles and a support member 27b formed of the support material particles is formed. The structure of the formation apparatus suitably used in the electrophotographic process is not limited to the structure illustrated in FIG. 7.

The functions of the material supply portion 21 and the photosensitive member 22 are assembled into a cartridge, and the formation apparatus is allowed to have a cartridge-exchangeable structure. This structure facilitates the supply and exchange of the materials and is thus preferred. The cartridge may include a photosensitive member, a charging means that electrostatically charges the photosensitive member, an opening that allows the photosensitive member to be irradiated with laser light, a material reservoir, and a material supply means, the material reservoir and the material supply means corresponding to the material supply portion.

In the case where the constituent particles according to an embodiment of the present invention are used as the support material particles, the formation apparatus at least has a structure in which a cartridge including a material reservoir that contains a power including the structural material particles and a cartridge including a material reservoir that contains a powder including the constituent particles according to an embodiment of the present invention are detachable. To prevent shortage of the constituent particles during formation, preferably, auxiliary cartridges for the structural material particles and the support material particles each include a detachable portion.

As has been described above, when the water-insoluble three-dimensional object is produced by the additive manufacturing process, the case of using the constituent particles according to an embodiment of the present invention as the support material particles has been described. The application of the constituent particles according to an embodiment of the present invention is not limited thereto. For example, when a water-soluble three-dimensional object is produced by the additive manufacturing process, the constituent particles according to an embodiment of the present invention are preferable as structural material particles.

Examples

Examples will be described below. In examples, powders A to O including constituent particles each including a core and a shell according to an embodiment of the present invention, and powders P and Q each including particles that did not include a shell were produced, and evaluations were performed to determine whether they are suitable as materials used to form an object.

Methods for preparing base particles 1 to 4 used as cores of the constituent particles included in powders A to O will be described, and then a method for preparing each powder will be described.

Preparation of Base Particles 1

First, 89 g of a maltotetraose powder (Nisshoku Fuji Oligo #450, from Nihon Shokuhin Kako Co., Ltd.) and 38 g of lactitol (lactitol LC-0, from B Food Science Co., Ltd.) were dissolved in 168 g of water. After 113 g of cellulose (Celish FD200L, from Daicel FineChem Ltd.) was dispersed therein, the mixture was atomized with a spray dryer. The resulting powder was classified to give base particles 1 having an average particle diameter of 23 μm. The percentage by volume of a water-soluble material in each of the particles was 85%. The particles had a water solubility of 50 or more and a softening temperature of 120° C. The average particle diameter was measured with a laser diffraction/scattering particle size distribution analyzer LA-950 (HORIBA, Ltd).

A batch cell containing a measurement solvent was placed on the laser diffraction/scattering particle size distribution analyzer LA-950 (HORIBA, Ltd.), and an optical axis and a background were adjusted. As the solvent used here, a solvent in which the particles are little dissolved needs to be selected. As the solvent used here, a solvent in which the particles are not dissolved needs to be selected. Here, isopropyl alcohol (reagent grade, from Kishida Chemical Co., Ltd.) was used.

The prepared powder was added to the batch cell until the transmittance of light emitted from a tungsten lamp reached 95% to 90%, and then the particle size distribution is measured. The average particle diameter of base particles 1 on a volume basis was calculated from the measurement results. The average particle diameters of other particles were measured in the same way as above.

Preparation of Base Particles 2

First, 84 g of a maltotetraose powder (Nisshoku Fuji Oligo #450, from Nihon Shokuhin Kako Co., Ltd.) and 36 g of lactitol (lactitol LC-0, from B Food Science Co., Ltd.) were dissolved in 107 g of water. After 113 g of cellulose (Celish FD200L, from Daicel FineChem Ltd.) was dispersed therein, the mixture was atomized with a spray dryer. The resulting powder was classified to give base particles 2 having an average particle diameter of 23 μm. The percentage by volume of a water-soluble material in each of the particles was 80%. The particles had a water solubility of 50 or more and a softening temperature of 135° C.

Preparation of Base Particles 3

Particles of a maltotetraose powder (Nisshoku Fuji Oligo #450, from Nihon Shokuhin Kako Co., Ltd.) were used as base particles 3. The particles had an average particle diameter of 88 μm. The maltotetraose particles are a water-soluble material, had a water solubility of 50 or more, and a softening temperature of 160° C.

Preparation of Base Particles 4

A maltotetraose powder (Nisshoku Fuji Oligo #450, from Nihon Shokuhin Kako Co., Ltd.) was mixed, pulverized, and classified to give base particles 4 having an average particle diameter of 85 μm. The particles had a water solubility of 50 or more and a softening temperature of 160° C.

Preparation of Powder A

Into a dry particle composing machine (Nobilta NOB-130, from Hosokawa Micron Corporation), 1.68 g of a silicone resin (XC99-A8808, from Momentive Performance Materials Japan LLC) and 335 g of a powder formed of base particles 1 were charged. The mixture was subjected to stirring treatment at a rotor load of 2 kW for 1 hour. The silicone resin was a water-insoluble material and had a water solubility of 1 or less. The resulting powder was classified to give powder A formed of particles each having a core formed of each of base particles 1 and a shell composed of the silicone resin.

Preparation of Powder B

Powder B formed of particles each having a core formed of each of base particles 2 and a shell composed of the silicone resin was prepared as in powder A, except that a powder formed of base particles 2 was used in place of the powder formed of base particles 1.

Preparation of Powder C

Into a dry particle composing machine (Nobilta NOB-130, from Hosokawa Micron Corporation), 3.35 g of a silicone resin (XC99-A8808, from Momentive Performance Materials Japan LLC) and 335 g of a powder formed of base particles 2 were charged. The mixture was subjected to stirring treatment at a rotor load of 2 kW for 1 hour. The silicone resin was a water-insoluble material. The resulting powder was classified to give powder C formed of particles each having a core formed of each of base particles 2 and a shell composed of the silicone resin.

Preparation of Powder D

Into a dry particle composing machine (Nobilta NOB-130, from Hosokawa Micron Corporation), 10.1 g of a silicone resin (XC99-A8808, from Momentive Performance Materials Japan LLC) and 335 g of a powder formed of base particles 2 were charged. The mixture was subjected to stirring treatment at a rotor load of 2 kW for 1 hour. The silicone resin was a water-insoluble material. The resulting powder was classified to give powder D formed of particles each having a core formed of each of base particles 2 and a shell composed of the silicone resin.

Preparation of Powder E

A polystyrene resin (PSJ-polystyrene HF77, from PS Japan Corporation) was dissolved in toluene to prepare a 0.5% solution. The polystyrene resin was a water-insoluble material and had a water solubility of 1 or less. A step of spraying the solution on 700 g of a powder formed of base particles 1 and evaporating toluene with the powder flowing under heat was performed until the amount of the solution sprayed reached 1400 g in total. The resulting powder was classified to give powder E formed of particles each having a core formed of each of base particles 1 and a shell composed of the polystyrene resin.

Preparation of Powder F

A polystyrene resin (PSJ-polystyrene HF77, from PS Japan Corporation) was dissolved in toluene to prepare a 7.5% solution. The polystyrene resin was a water-insoluble material. A step of spraying the solution on 300 g of a powder formed of base particles 1 and evaporating toluene with the powder stirring was performed until the amount of the solution sprayed reached 40 g in total. The resulting powder was classified to give powder F formed of particles each having a core formed of each of base particles 1 and a shell composed of the polystyrene resin.

Preparation of Powder G

A polystyrene resin (PSJ-polystyrene HF77, from PS Japan Corporation) was dissolved in toluene to prepare a 7.5% solution. The polystyrene resin was a water-insoluble material. A step of spraying the solution on 300 g of a powder formed of base particles 1 and evaporating toluene with the powder stirring was performed until the amount of the solution sprayed reached 120 g in total. The resulting powder was classified to give powder G formed of particles each having a core formed of each of base particles 1 and a shell composed of the polystyrene resin.

Preparation of Powder H

Into a dry particle composing machine (Nobilta NOB-130, from Hosokawa Micron Corporation), 3.35 g of a styrene-acrylic resin (MP-5000, from Soken Chemical and Engineering Co., Ltd.) and 335 g of a powder formed of base particles 1 were charged. The mixture was subjected to stirring treatment at a rotor load of 2 kW for 30 minutes. The resulting powder H is formed of particles each having a core formed of each of base particles 1 and a shell composed of the styrene-acrylic resin. The styrene-acrylic resin is a water-insoluble material and had a water solubility of 1 or less.

Preparation of Powder I

Into a dry particle composing machine (Nobilta NOB-130, from Hosokawa Micron Corporation), 6.70 g of a styrene-acrylic resin (MP-5000, from Soken Chemical and Engineering Co., Ltd.) and 335 g of a powder formed of base particles 1 were charged. The mixture was subjected to stirring treatment at a rotor load of 2 kW for 30 minutes. The resulting powder I is formed of particles each having a core formed of each of base particles 1 and a shell composed of the styrene-acrylic resin.

Preparation of Powder J

Into a dry particle composing machine (Nobilta NOB-130, from Hosokawa Micron Corporation), 13.4 g of a styrene-acrylic resin (MP-5000, from Soken Chemical and Engineering Co., Ltd.) and 335 g of a powder formed of base particles 1 were charged. The mixture was subjected to stirring treatment at a rotor load of 2 kW for 30 minutes. The resulting powder J is formed of particles each having a core formed of each of base particles 1 and a shell composed of the styrene-acrylic resin.

Preparation of Powder K

First, 20 g of sucrose behenate (RYOTO Sugar Ester B370f, from Mitsubishi-Kagaku Foods Corporation) was dispersed in 1000 g of ethanol (reagent grade, from Kishida Chemical Co., Ltd). The dispersion was stirred and heated to 80° C. Sucrose behenate was a water-insoluble material and had a water solubility of 1 or less.

To the resulting solution, 200 g of a powder formed of base particles 1 was added. The resulting mixture was stirred for 5 minutes and then cooled to 60° C. over a period of 20 minutes. After cooling to normal temperature, the mixture was filtered. The resulting residue was dried while being disintegrated.

The resulting powder was classified to give powder K formed of particles each having a core formed of each of base particles 1 and a shell composed of sucrose behenate.

Preparation of Powder L

Powder L formed of particles each having a core formed of each of base particles 1 and a shell composed of sucrose behenate was prepared by the same preparation method as that of powder K, except that the amount of sucrose behenate added was 70 g.

Preparation of Powder M

Powder M formed of particles each having a core formed of each of base particles 1 and a shell composed of sucrose behenate was prepared by the same preparation method as that of powder K, except that the amount of sucrose behenate added was 20 g and the amount of ethanol was 2000 g.

Preparation of Powder N

Powder N formed of particles each having a core formed of each of base particles 3 and a shell composed of sucrose behenate was prepared by the same preparation method as that of powder K, except that a powder formed of base particles 3 was used in place of the powder formed of base particles 1.

Preparation of Powder O

Powder O formed of particles each having a core formed of each of base particles 4 and a shell composed of sucrose behenate was prepared by the same preparation method as that of powder K, except that a powder formed of base particles 4 was used in place of the powder formed of base particles 1.

Preparation of Powder P

A powder formed of base particles 1 was used as powder P.

Preparation of Powder Q

A powder formed of base particles 2 was used as powder Q.

The average particle diameter, the average circularity, and the coverage of each of powders A to Q prepared by the foregoing methods were determined. Table 1 summarizes the results. In Table 1, the amount of the shell material added is expressed in terms of 100 g of the amount of the core material added.

TABLE 1

| Type of particle | | powder A | powder B | powder C | powder D | powder E | powder F | powder G |
|---|---|---|---|---|---|---|---|---|
| Core | Type | base particle 1 | base particle 2 | base particle 2 | base particle 2 | base particle 1 | base particle 1 | base particle 1 |
| | Property | soluble in water | soluble in water | soluble in water | soluble in water | soluble in water | soluble in water | soluble in water |
| | Amount added (g) | 100 | 100 | 100 | 100 | 100 | 100 | 100 |
| Shell | Type | silicone | silicone | silicone | silicone | polystyrene | polystyrene | polystyrene |
| | Property | insoluble in water | insoluble in water | insoluble in water | insoluble in water | insoluble in water | insoluble in water | insoluble in water |
| | Amount added (g) | 0.5 | 0.5 | 1 | 3 | 1 | 1 | 3 |
| | Average particle diameter A (μm) | 24 | 24 | 24 | 24 | 26 | 25 | 26 |
| | Average circularity | 0.91 | 0.91 | 0.91 | 0.91 | 0.91 | 0.91 | 0.91 |
| | Coverage (%) | 39% | 36% | 45% | 56% | 72% | 86% | 87% |
| | Percentage by volume of water-soluble material in constituent particle (%) | 85% | 80% | 79% | 77% | 84% | 84% | 81% |
| | Percentage by volume of water-soluble material in core (%) | 85% | 80% | 80% | 80% | 85% | 85% | 85% |
| | Percentage by volume of water-soluble material in shell (%) | 0% | 0% | 0% | 0% | 0% | 0% | 0% |

| Type of particle | | powder H | powder I | powder J | powder K | powder L |
|---|---|---|---|---|---|---|
| Core | Type | base particle 1 | base particle 1 | base particle 1 | base particle 1 | base particle 1 |
| | Property | soluble in water | soluble in water | soluble in water | soluble in water | soluble in water |
| | Amount added (g) | 100 | 100 | 100 | 100 | 100 |
| Shell | Type | styrene-acrylic | styrene-acrylic | styrene-acrylic | sucrose behenate | sucrose behenate |
| | Property | insoluble in water | insoluble in water | insoluble in water | insoluble in water | insoluble in water |
| | Amount added (g) | 1 | 2 | 4 | 10 | 35 |
| | Average particle diameter A (μm) | 23 | 23 | 23 | 26 | 28 |
| | Average circularity | 0.91 | 0.91 | 0.91 | 0.91 | 0.91 |
| | Coverage (%) | 37% | 91% | 96% | 97% | 100% |
| | Percentage by volume of water-soluble material in constituent particle (%) | 84% | 83% | 80% | 76% | 60% |
| | Percentage by volume of water-soluble material in core (%) | 85% | 85% | 85% | 85% | 85% |
| | Percentage by volume of water-soluble | 0% | 0% | 0% | 0% | 0% |

TABLE 1-continued

| Type of particle | | powder M | powder N | powder O | powder P | powder Q |
|---|---|---|---|---|---|---|
| Core | Type | base particle 1 | base particle 3 | base particle 4 | base particle 1 | base particle 2 |
| | Property | soluble in water | soluble in water | soluble in water | soluble in water | soluble in water |
| | Amount added (g) | 100 | 100 | 100 | 100 | 100 |
| Shell | Type | sucrose behenate | sucrose behenate | sucrose behenate | — | — |
| | Property | insoluble in water | insoluble in water | insoluble in water | — | — |
| | Amount added (g) | 100 | 10 | 10 | — | — |
| Average particle diameter A (μm) | | 28 | 88 | 85 | 23 | 23 |
| Average circularity | | 0.91 | 0.91 | 0.82 | 0.91 | 0.91 |
| Coverage (%) | | 100% | 97% | 96% | 0% | 0% |
| Percentage by volume of water-soluble material in constituent particle (%) | | 39% | 90% | 90% | 85% | 80% |
| Percentage by volume of water-soluble material in core (%) | | 85% | 100% | 100% | 85% | 80% |
| Percentage by volume of water-soluble material in shell (%) | | 0% | 0% | 0% | — | — |

Examples 1 to 15 and Comparative Examples 1 and 2

In these examples, each of powders A to O was evaluated as described below. In Comparative examples 1 and 2, each of powders P and Q was similarly evaluated.

Evaluation of Change in Flowability of Powder

On a sieve with openings having a size 5 to 7 times the average particle diameter, 1.00 g of each of the powders maintaining as-prepared states was placed. Each powder was shaken at a frequency of 100 for 10 seconds. The oversize fraction of the powder was weighed. The use of the sieve with openings each having a size 5 to 7 times the average particle diameter reduces the effect of electrostatic aggregation of the particles. This enables the determination of the degree of aggregation or fusion of the particles due to humidity.

Into a 100-mL polymer cup, 2.0 g of each of the powders maintaining as-prepared states was charged. The polymer cup containing each powder was hermetically sealed in a bag and allowed to stand in an environment tester set at 25° C. and a humidity of 55% until the temperature of the powder reached the environmental temperature. This step can eliminate the effect of condensation due to a rapid change in temperature. After 15 minutes, the bag was opened, and the polymer cup was allowed to stand in the environment for 7 hours. Then the polymer cup containing the powder was removed from the environment tester. Regarding the temperature and humidity conditions described above, the humidity environment is equivalent to the maximum humidity environment specified in the recommended operating conditions of a common 3D printer.

The flowability of the powder that had been allowed to stand was evaluated by the same method as that used for the powder that had not been allowed to stand in the environment tester. A change in the weight of the oversize fraction of the powder before and after allowing to stand was calculated and rated. The evaluation criteria are described below.

Rank A: The change in weight is 5% or less.
Rank B: The change in weight is more than 5% and 20% or less.
Rank C: The change in weight is more than 20% and 90% or less.
Rank D: The change in weight is more than 90%.

In the powder rated rank A, even the powder that had been allowed to stand had satisfactory flowability. In the powder rated rank B, only a small number of particles of the powder that had been allowed to stand were aggregated or fused to reduce the flowability of the powder. In the powder rated rank C, a small number of particles of the powder that had been allowed to stand were aggregated or fused to reduce the flowability of the powder. In the powder rated rank D, half or more of the particles of the powder that had been allowed to stand were aggregated or fused to significantly reduce the flowability of the powder.

Figure 4:
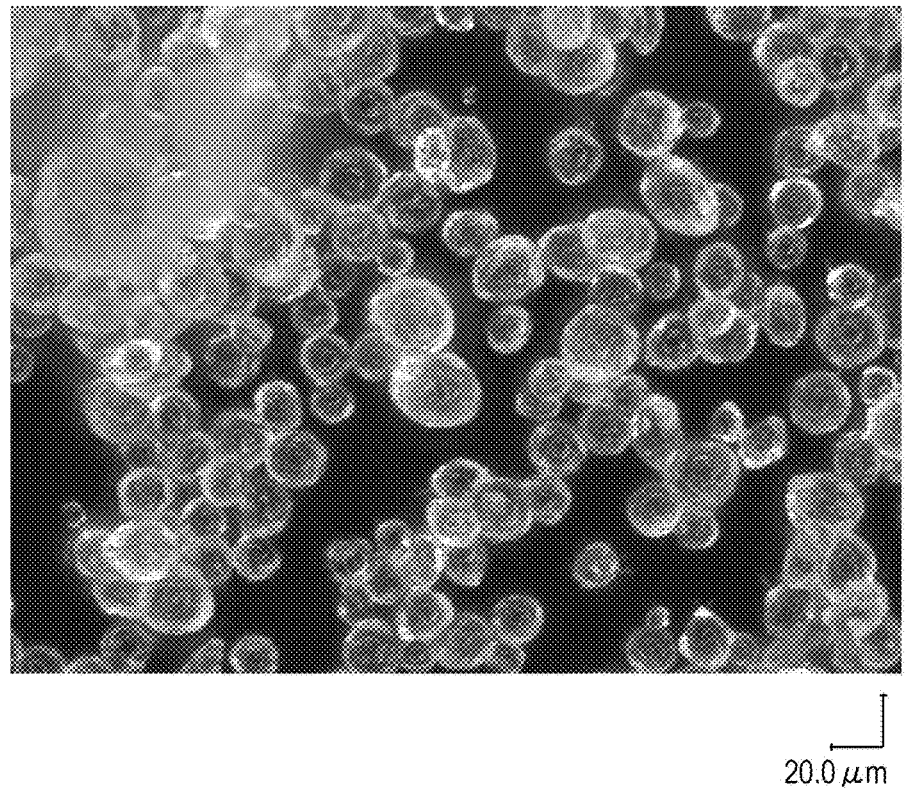
FIG. 4 is a photograph illustrating a state of powder I that has been allowed to stand in a humid environment.

FIG. 4 illustrates a photomicrograph of the powder that is rated rank A and that has been allowed to stand.

In the case where an item is formed with the powder rated rank D, the reduced flowability of the powder due to exposure to the humid environment for prolonged periods of time causes problems of nonuniform thickness of a particle layer and the formation of defects in the particle layer at the time of the formation of the particle layer. In particular, when the particles are severely aggregated, the particles cannot be even laminated, in some cases.

Figure 5:
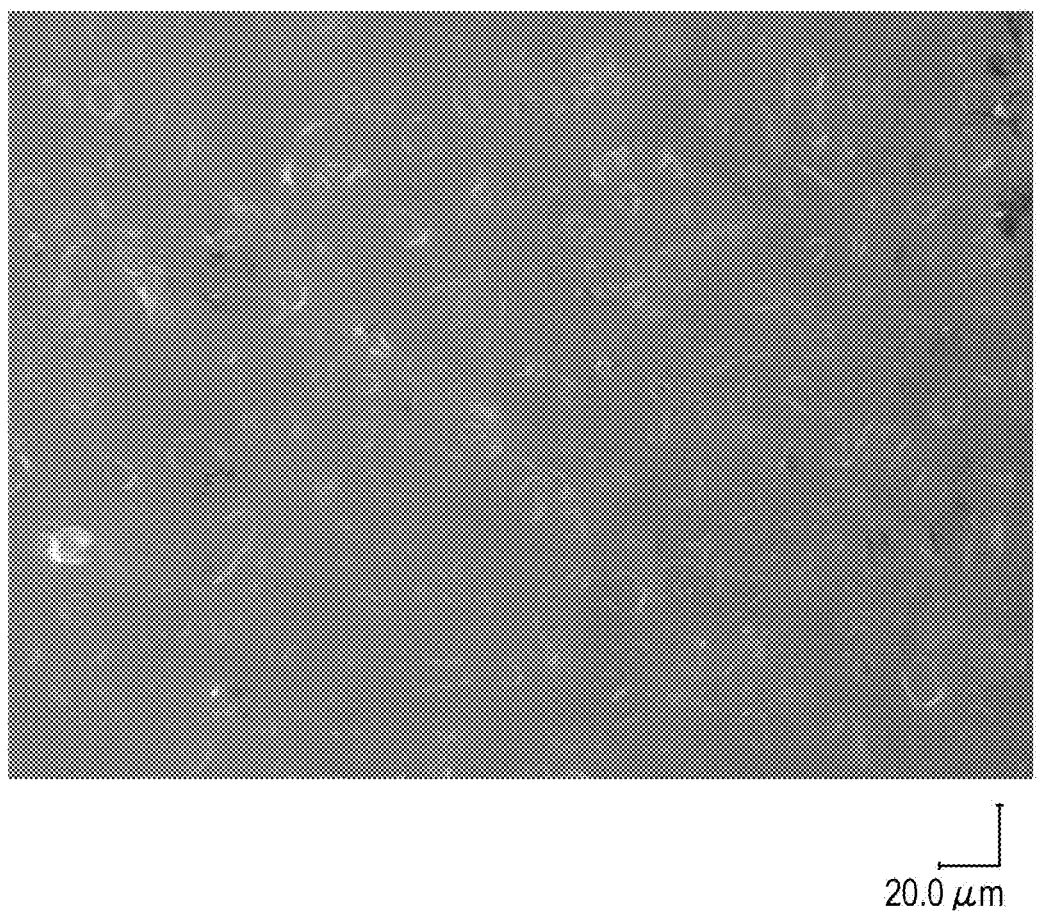
FIG. 5 is a photograph illustrating a state of powder P that has been allowed to stand in a humid environment.

FIG. 5 illustrates a photomicrograph of the powder that is rated rank D and that has been allowed to stand. In powders P and Q, aggregation and fusion of the particles proceeded to form coalesced aggregates. In the case where an item is formed with the powder rated rank A or B, a serious problem does not arise in actual use. The powder rated rank A has particularly good stability in a humid environment. The use of the powder rated rank A enables the formation of a particle layer having a uniform thickness and a uniform density and thus enables the production of an item with very high accuracy.

Evaluation of Change in Volume Due to Water

Each of the prepared powders was disposed on a base in an amount of 1.5 to 2.5 mg/cm$^2$ to form particle layers. The particle layers were heated to a temperature equal to or higher than the softening temperature of the particles to form sheets. A step of stacking the sheets and subjecting the resulting stack to thermocompression bonding at a temperature equal to or higher than the softening temperature of the particles under a pressure of 0.01 kgf/cm² or more was repeated to form an item having a thickness of about 1 mm.

The resulting item was exposed to flowing water for 300 minutes at a flow rate of 3000 mL/min. A change in volume due to water was evaluated according to evaluation criteria described below.

The measurement of the change in volume was performed by a known volume measurement method. When the item collapsed, the volume of an item fragment having the largest volume was measured. The change in volume from the initial volume was calculated.

Table 2 lists the evaluation results.
Rank A: The change in volume is 90% or more.
Rank B: The change in volume is 5% or more and less than 90%.
Rank C: The change in volume is less than 5%.

When a laminate is formed with the powder rated rank A or B, the laminate can be removed with water. In particular, the laminate formed of the powder rated rank A can be easily removed.

Evaluation of Void in Laminate

Each of the prepared powders was disposed on a base in an amount of 1.5 to 2.5 mg/cm² to form particle layers. The particle layers were heated to a temperature equal to or higher than the softening temperature of the particles to form sheets. A step of stacking the sheets and subjecting the resulting stack to thermocompression bonding at a temperature equal to or higher than the softening temperature of the particles under a pressure of 0.01 kgf/cm² or more was repeated to form a laminate having a thickness of about 5 mm.

The resulting laminate was checked for a void by observing a cross section of the laminate under a scanning electron microscope (SEM) and evaluated according to evaluation criteria described below.
Rank A: A void is observed in the laminate.
Rank B: A large number of voids are observed in the laminate.

Examples 16 to 21

In these examples, powders E to J were evaluated as described below.

Evaluation of Removal Rate with Water

Each of the prepared powders was disposed on a base in an amount of 1.5 to 2.5 mg/cm² so as to form a circular shape with a radius of 15 mm, thereby forming particle layers. The particle layers were heated to a temperature equal to or higher than the softening temperature of the particles to form sheets. A step of stacking the sheets and subjecting the resulting stack to thermocompression bonding at a temperature equal to or higher than the softening temperature of the particles under a pressure of 0.01 kgf/cm² or more was repeated to form an item having a thickness of 2 to 3 mm.

The resulting item was exposed to flowing water for 60 minutes at a flow rate of 3000 mL/min. The removal rate (mm/h) of the circular item was calculated from a change in the volume of the item and evaluated according to evaluation criteria described below.

The measurement of the change in volume was performed by a known volume measurement method. When the item collapsed, the volume of an item fragment having the largest volume was measured. The change in volume from the initial volume was calculated.

Table 3 lists the evaluation results.
Rank A: The removal rate is 0.15 mm/h or more.
Rank B: The removal rate is less than 0.15 mm/h.

The item formed of the powder rated rank A can be more suitably used as a support member that has a columnar structure and that supports an object because the 0.3-mm-thick column can be removed in less than 1 hour.

TABLE 2

|  | Example 1 | Example 2 | Example 3 | Example 4 | Example 5 | Example 6 | Example 7 | Example 8 | Example 9 |
|---|---|---|---|---|---|---|---|---|---|
| Type of particle | Powder A | Powder B | Powder C | Powder D | Powder E | Powder F | Powder G | Powder H | Powder I |
| Evaluation of change in volume due to water | A | A | A | A | A | A | A | A | A |
| Evaluation of change in flowability | B | B | A | A | A | A | A | A | A |
| Evaluation of void in laminate | A | A | A | A | A | A | A | A | A |

|  | Example 10 | Example 11 | Example 12 | Example 13 | Example 14 | Example 15 | Comparative example 1 | Comparative example 2 |
|---|---|---|---|---|---|---|---|---|
| Type of particle | Powder J | Powder K | Powder L | Powder M | Powder N | Powder O | Powder P | Powder Q |
| Evaluation of change in volume due to water | A | A | B | B | A | A | A | A |
| Evaluation of change in flowability | A | A | A | A | A | A | D | D |
| Evaluation of void in laminate | A | A | A | A | A | B | A | A |

TABLE 3

|  | Example 16 | Example 17 | Example 18 | Example 19 | Example 20 | Example 21 |
|---|---|---|---|---|---|---|
| Type of particle | Powder E | Powder F | Powder G | Powder H | Powder I | Powder J |
| Evaluation of removal rate with water | A | A | A | A | A | B |

The results from the foregoing examples indicated that powders A to O according to an embodiment of the present invention can be preferably used as constituent particles suitable for the production of a three-dimensional object because the item formed of any of powders A to O can easily collapse upon coming into contact with water even though powders A to O have good moisture resistance in the form of powder. In contrast, powders P and Q used in the comparative examples had good water solubility and poor moisture resistance. Thus, the particles were significantly aggregated or fused together. FIG. 5 is a photomicrograph illustrating a state of powder P fused in the evaluation of the change in the flowability of the powder.

Examples 22 to 31 and Comparative Example 3

In these examples, powders A to J were evaluated as described below. In this comparative example, powder P was similarly evaluated.

Evaluation of Charge Retention Properties

The charge retention properties were evaluated by a method as described below.

A measurement method in conformity with Japanese Industrial Standards (JIS) C61340-2-1 was performed with a charge decay device (Model NS-D100, from Nano Seeds Corporation).

Specifically, each of the powders formed of particles was electrically charged by corona discharge, and a change in the potential of the powder with time was measured with a surface potential meter. The measurement was performed under conditions: applied voltage: −600 V, applied time: 1 s, measurement time: 600 s, and measurement environment: 25° C., 45 to 50% RH (indoor environment).

Figure 6:
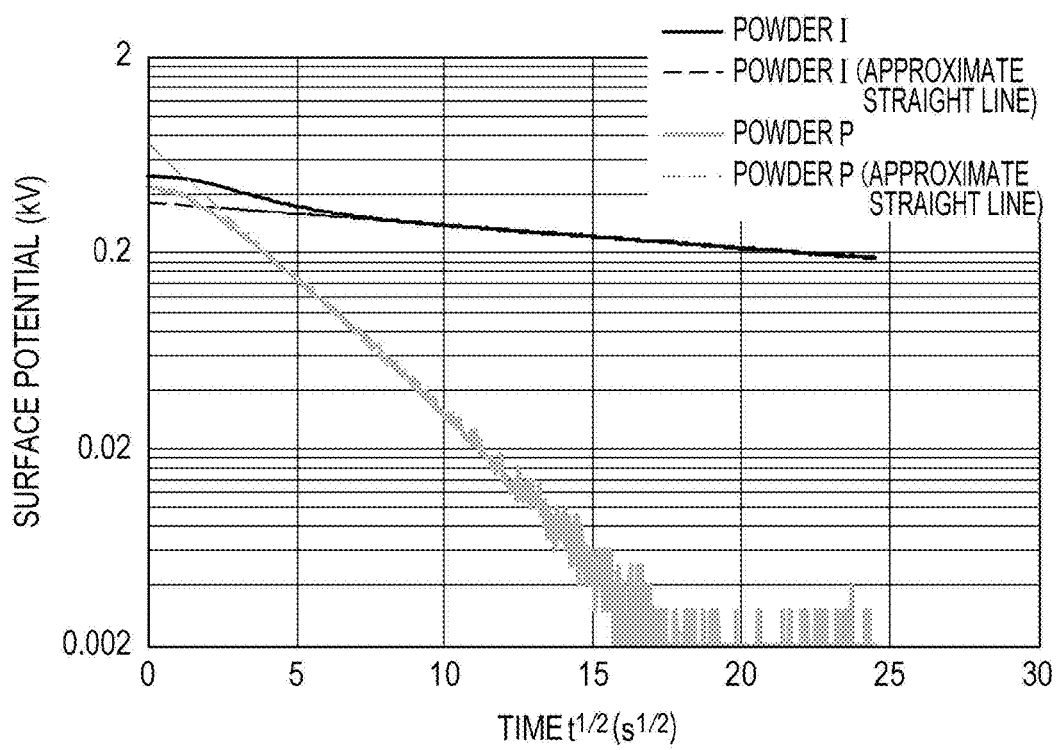
FIG. 6 is an example of a graph of charge decay.

The potential was measured at specified intervals. By taking the log of both sides of expression 1 and substituting the measured values for the corresponding variables in the resulting expression, the data was plotted. The longest linear portion of the graph where a linear approximation could be used was extracted, and the decay rate α was calculated.

$$V = V_0 \exp(-\alpha \sqrt{t})$$ (expression 1)

where
V: surface potential
V0: initial surface potential
t: decay time
α: decay rate As an example, FIG. 6 illustrates charge decay graphs of powders I and P, graphs being obtained from potential values measured at specified intervals and expression 1, together with approximate straight lines.

Evaluation of Applicability to Electrophotography

Applicability to electrophotography was evaluated by a method described below.

Toner in a commercially available toner cartridge (CRG) for electrophotography is removed. Each of the powders was charged thereinto. The powder developed on an electrostatic latent image-bearing member was transferred using an electrostatic force. The transfer efficiency was calculated from the ratio of the amount of the powder on the electrostatic latent image-bearing member to the amount of the powder transferred to the transfer member.

According to evaluation criteria described below, the applicability to electrophotography was evaluated on the basis of the resulting transfer efficiency.

Rank A: The transfer efficiency is 90% or more.
Rank B: The transfer efficiency is 70% or more and less than 90%.
Rank C: The transfer efficiency is less than 70%.

In the powder rated rank A, because there are only a few particle-free portions in a particle layer, when the particle layer is laminated, lamination failure attributed to lamination on the particle-free portions is less likely to occur. Thus, the powder rated rank A can be preferably used in the electrophotographic process. In the powder rated rank C, because there are a large number of particle-free portions in a particle layer, lamination failure often occurs.

Table 4 lists the decay rates α obtained from the evaluation results of the charge retention properties and the evaluation results of the applicability to electrophotography of powders A to J and P.

TABLE 4

|  | Example 22 | Example 23 | Example 24 | Example 25 | Example 26 | Example 27 |
|---|---|---|---|---|---|---|
| Type of particle | Powder A | Powder B | Powder C | Powder D | Powder E | Powder F |
| Decay rate α | 0.2 | 0.2 | 0.1 | 0.0 | 0.0 | 0.0 |
| Evaluation of applicability to electrophotography | A | A | A | A | A | A |

|  | Example 28 | Example 29 | Example 30 | Example 31 | Comparative example 3 |
|---|---|---|---|---|---|
| Type of particle | Powder G | Powder H | Powder I | Powder J | Powder P |
| Decay rate α | 0.0 | 0.1 | 0.0 | 0.0 | 0.3 |
| Evaluation of applicability to electrophotography | A | A | A | A | C |

Accordingly, powders A to J are effective against charge decay, compared with powder P, and can be suitably used in the electrophotographic process.

A three-dimensional object was produced by the electrophotographic process, powder L being used as support material particles, and particles of a powder obtained by pulverizing ABS (Techno ABS 130, from Techno Polymer Co., Ltd.) being used as structural material particles.

An item including a structural material portion and a support material portion was produced with the apparatus illustrated in FIG. 7 by forming particle layers each having a pattern formed of the structural material particles and the support material particles and laminating the particle layers together.

A portion of the item formed of particle L (support member) was easily removed by exposing the resulting item to flowing water, thereby resulting in the target three-dimensional object composed of ABS.

According to an embodiment of the present invention, it is possible to provide constituent particles suitable for the production of a three-dimensional object, in which a support member can be easily removed by bringing the support member into contact with a water-containing solvent.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. Constituent particles each containing at least one water-soluble material, each of the constituent particles comprising:
   a core; and
   a shell that covers at least part of a surface of the core,
   the core containing the at least one water-soluble material most abundantly, and
   a material contained in the shell most abundantly having a lower water solubility than the at least one water-soluble material contained in the core.

2. The constituent particles according to claim 1, wherein a coverage of the surface of the core by the shell is 40% or more and 95% or less.

3. The constituent particles according to claim 1, wherein each of the constituent particles contains the at least one water-soluble material in an amount of 70% or more by volume.

4. The constituent particles according to claim 1, wherein a percentage of the core of each of the constituent particles is 50% or more by volume.

5. The constituent particles according to claim 1, wherein a percentage of the at least one water-soluble material contained in the core is 50% or more by volume with respect to the entire core.

6. The constituent particles according to claim 1, wherein the at least one water-soluble material contained in the core is any of a water-soluble inorganic material, a water-soluble hydrocarbon, poly(alkylene oxide), poly(vinyl alcohol), and poly(ethylene glycol).

7. The constituent particles according to claim 1, wherein the material contained in the shell most abundantly is any of an organic material, a metal, an inorganic material, and an organic-inorganic hybrid material.

8. The constituent particles according to claim 7, wherein the organic-inorganic hybrid material is a compound including a main skeleton composed of a siloxane bond and a side chain composed of an organic group.

9. The constituent particles according to claim 8, wherein the side chain composed of the organic group is a methyl group.

10. The constituent particles according to claim 1, wherein the at least one water-soluble material contained in the core has a water solubility more than 1.

11. The constituent particles according to claim 1, wherein the material contained in the shell most abundantly has a water solubility less than 10.

12. The constituent particles according to claim 1, wherein the at least one water-soluble material contained in the core comprises a plurality of types of water-soluble materials, and
   the material contained in the shell most abundantly has a lower water solubility than any of the water-soluble materials in the core.

13. The constituent particles according to claim 1, wherein the core or the shell contains a thermoplastic material.

14. The constituent particles according to claim 1, wherein the constituent particles have an average particle diameter of 1 µm or more and 100 µm or less on a volume basis.

15. The constituent particles according to claim 1, wherein the constituent particles have an average circularity of 0.85 or more.

16. A powder, comprising:
   the constituent particles according to claim 1.

17. The powder according to claim 16, wherein when the powder is sifted through a sieve with openings having a size 5 to 7 times the average particle diameter, a difference in weight between an oversize fraction of the powder as prepared and an oversize fraction of the powder that has been allowed to stand at a temperature of 25° C. and a humidity of 55% for 7 hours is 20% or less.

18. The powder according to claim 17, wherein the change in weight is 5% or less.

19. A method for producing a three-dimensional object, comprising the steps of:
   forming an item by disposing structural material particles and support material particles; and
   removing a portion formed of the support material particles from the item by bringing the portion formed of the support material particles into contact with a water-containing solvent,
   the constituent particles according to claim 1 being used as the support material particles.

20. The method according to claim 19, wherein the step of forming an item by disposing structural material particles and support material particles includes a substep of applying thermal energy to the structural particles and the support material particles to fuse the structural particles and the support material particles, the substep being repeated multiple times.

* * * * *